United States Patent [19]
Yashima

[11] Patent Number: 5,791,621
[45] Date of Patent: Aug. 11, 1998

[54] SUPPORTING DEVICE FOR A TV RECEIVER

[76] Inventor: Seiichi Yashima, 186, Tamaboko 3-chome, Kanazawa-shi, Ishikawa 921, Japan

[21] Appl. No.: 883,304

[22] Filed: Jun. 27, 1997

Related U.S. Application Data

[63] Continuation of Ser. No. 629,741, Apr. 9, 1996, abandoned.

[30] Foreign Application Priority Data

Apr. 11, 1995 [JP] Japan .................... 7-085806

[51] Int. Cl.$^6$ .................................. A47B 81/06
[52] U.S. Cl. .................. 248/371; 248/922; 348/827
[58] Field of Search ..................... 248/371, 396, 248/397, 917, 919, 921, 922, 923, 924; 345/126, 905; 348/825, 827, 836

[56] References Cited

U.S. PATENT DOCUMENTS

| | | | |
|---|---|---|---|
| D. 321,179 | 10/1991 | Oyama | D14/113 |
| 2,805,411 | 9/1957 | Rose | 248/922 X |
| 4,494,720 | 1/1985 | Gregory et al. | 248/921 X |
| 4,706,920 | 11/1987 | Ojima et al. | 248/923 X |
| 5,134,390 | 7/1992 | Kishimoto et al. | |
| 5,329,289 | 7/1994 | Sakamoto et al. | 248/922 X |
| 5,400,993 | 3/1995 | Hamilton | |
| 5,518,216 | 5/1996 | Wu | 248/923 X |

FOREIGN PATENT DOCUMENTS

| | | | |
|---|---|---|---|
| 5-108013 | 4/1993 | Japan | 345/905 |

*Primary Examiner*—Pamon O. Ramirez
*Assistant Examiner*—Stephen S. Wentsler
*Attorney, Agent, or Firm*—Oblon, Spivak, McClelland, Maier & Neustadt, P.C.

[57] ABSTRACT

A supporting device for a TV receiver which enables the viewer even while lying down to comfortably view the TV. The supporting device includes a frame and a chassis for holding the TV. The frame includes an at least partially circular guide member, which has a horizontal axis. The chassis can turn round the axis in rotatable engagement with the guide member by at least 90° with respect to the surface on which the frame is set.

3 Claims, 7 Drawing Sheets

SUPPORTING DEVICE FOR A TV RECEIVER

This application is a Continuation of application Ser. No. 08/629,741, filed Apr. 9, 1996, now abandoned.

BACKGROUND OF THE INVENTION

1. Field of the Invention

The present invention relates to a supporting device for holding a TV receiver at an optional angle to the surface on which the supporting device is set.

2. Description of the Prior Art

In many cases, TVs are set on racks. Each of the racks has a frame and a roof or top plate on the frame. A TV can be set on the roof. The roofs of some of the racks are fixed, and the roofs of others can horizontally turn relatively to the respective frames. By turning such a movable roof in either direction, the screen of the TV set on the roof can be properly directed to the viewer.

None of the racks can, however, turn each of the respective TV screens on any axis other than a vertical axis. Therefore, there is a need for a viewer while lying down to unnaturally keep only his/her head upright. This is liable to cause muscular fatigue and/or fatigue of the eyes. This is very inconvenient particularly for the inpatients and/or the physically handicapped who are not free to change their viewing postures.

SUMMARY OF THE INVENTION

In view of the problems in the prior art, it is the object of the present invention to provide a supporting device for a TV receiver which enables the viewer, even when lying down, to comfortably view the TV.

A supporting device for a TV receiver according to the invention comprises a frame and a chassis for holding a TV receiver. The frame includes an at least partially circular guide member having a horizontal axis. The guide member guides the chassis in such a manner that the chassis can turn about the horizontal axis by an angle of at least 90° to the surface on which the frame is set.

As a result, the supporting device can tilt the TV screen to an optional angle within the range of 90° from the upright position in accordance with the viewing angle (i.e., inclination of the viewer's head).

The chassis may be driven by a motor. As a result, the chassis holding a TV can be smoothly and automatically turned relatively to the frame.

The chassis may be locked relatively to the frame by a lock member. As a result, the chassis can be held at an angle to the guide and kept from freely turning.

The chassis may be formed integrally with the case of a TV. As a result, there is no need for the chassis to house a TV, which would otherwise be a separate body. In addition, it is possible to make the overall structure more compact.

BRIEF DESCRIPTION OF THE DRAWINGS

The above and other objects, features and advantages of the present invention will become apparent from the following detailed description read in conjunction with the accompanying drawings, in which the same or like reference numerals designate equivalent elements, and in which:

FIGS. 10 (A), 10 (B) and 10 (D) are each a schematic front view in cross section of modification of the lock member;

FIG. 10 (C) is a schematic plan view of modification of lock member.

DESCRIPTION OF THE PREFERRED EMBODIMENTS

Figure 1:
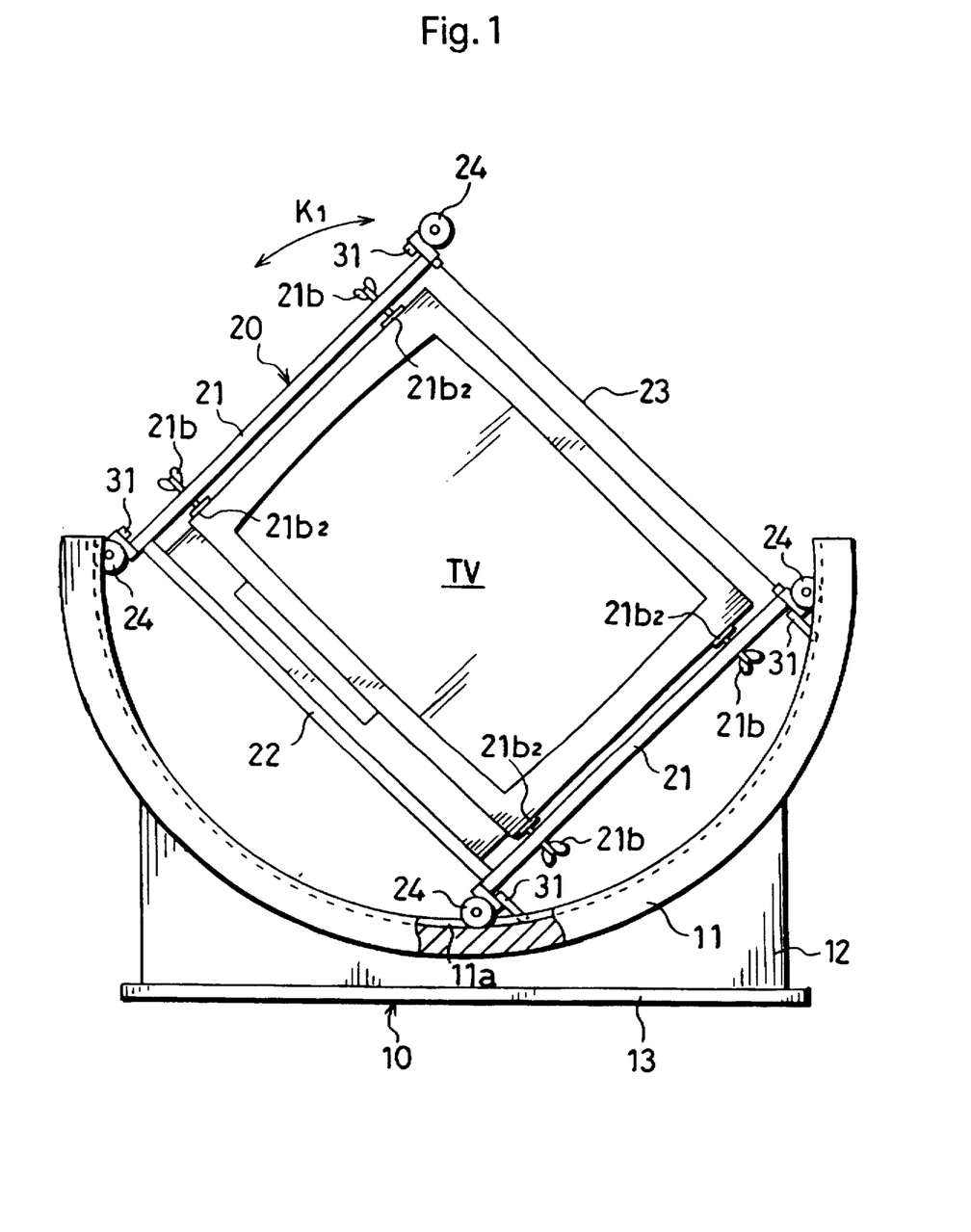
FIG. 1 is a front view, partially in cross section, of a supporting device for a TV receiver according to one embodiment of the invention.

With reference to FIG. 1, the supporting device for a TV receiver includes a frame 10 and a chassis 20 for holding a TV receiver. The frame 10 includes a semi-cylindrical guide member 11. The chassis 20 can turn about the horizontal axis along the guide member 11 relatively to the frame 10.

Figure 2:
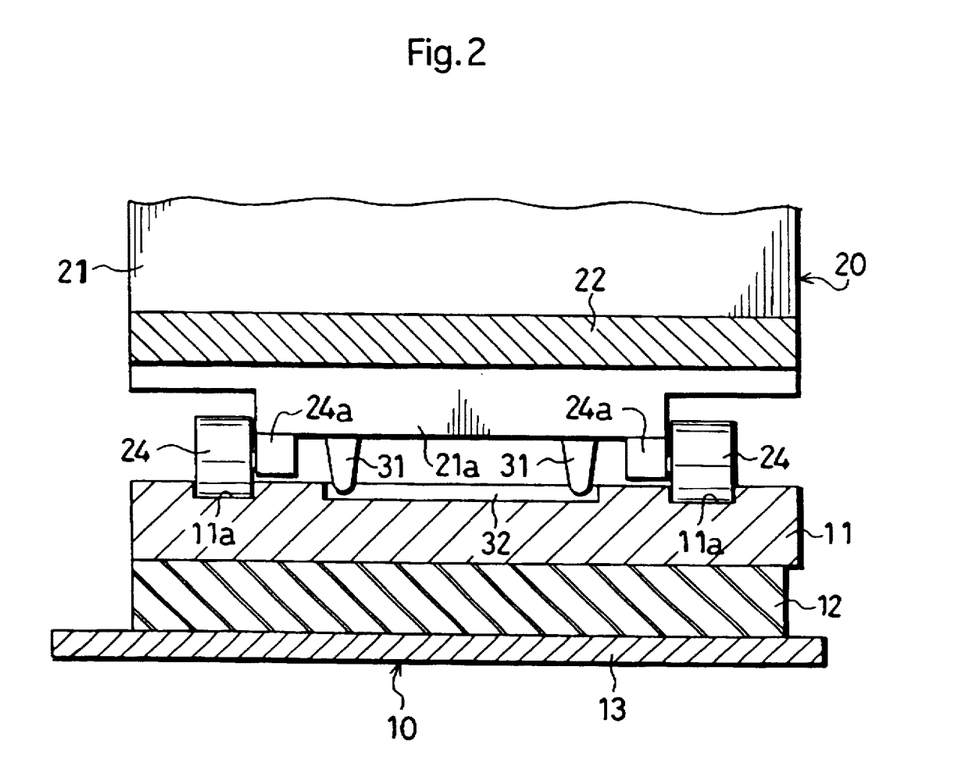
FIG. 2 is an enlarged side view In cross section of part of the supporting device, showing the engagement between the chassis and guide.

With reference to FIGS. 1 and 2, the frame 10 further has a leg 12 supporting the guide member 11 and a base plate 13 under the leg 12. The guide member 11 is formed like a half of a split cylinder. Both axial ends, which are the front and rear ends, of the guide member 11 are arcuate. The guide member 11 has a pair of arcuate guide grooves 11a formed in its inner periphery near its axial ends, respectively. The leg 12 has an arcuate top for engagement with the guide member 11.

Figure 3:
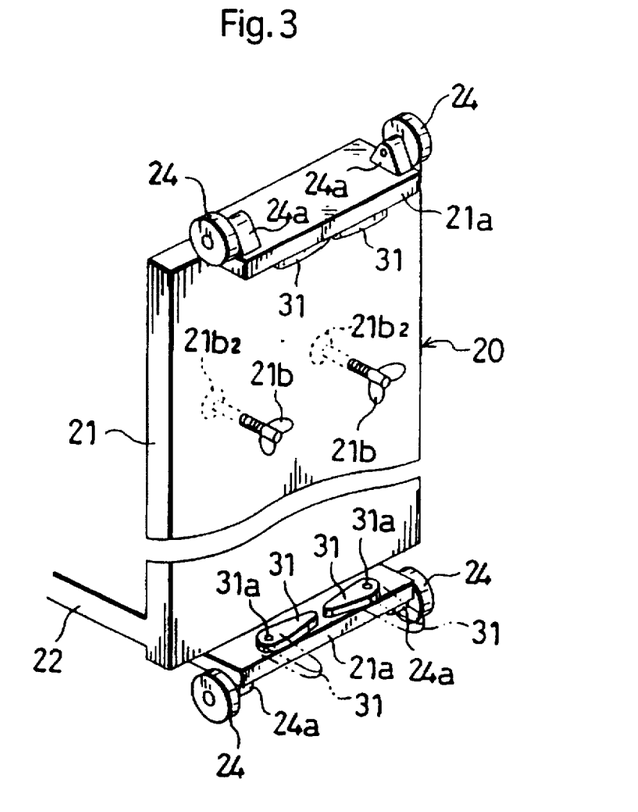
FIG. 3 is a perspective view of part of the chassis, showing the structure of the locking levers.

With reference to FIGS. 1-3, the chassis 20 is formed like a frame and has an open top, a pair of side plates 21, 21 and a bottom plate 22. The side plates 21, 21 extend from both ends of the bottom plate 22 perpendicularly to the bottom plate. The tops of the side plates 21, 21 are interconnected by a wire, cable or rope 23, to which proper tension is applied by a tension means (not shown). In place of the wire 23, a removable connector may be used.

Each side plate 21 has a pair of roller supporting shelves 21a, 21a projecting outward from its top and bottom, respectively. Each upper shelf 21a has a pair of brackets 24a on its top at its front and rear ends, respectively. Each lower shelf 21a has a pair of brackets 24a on its bottom at its front and rear ends, respectively. Each front bracket 24a supports a roller 24 in front of it. Each rear bracket 24a supports a roller 24 in the rear of it. As best shown in FIG. 2, the front and rear rollers 24 can engage with the front and rear guide grooves 11a, respectively. The rollers 24 can rotate and move in the guide grooves 11a, so that the chassis 20 can turn along the guide member 11 in the direction shown by arrow K1 (FIG. 1).

Figure 4:
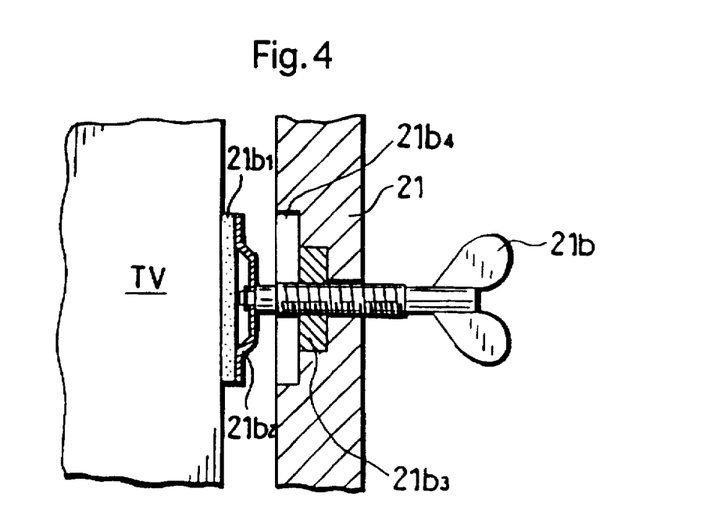
FIG. 4 is an enlarged front view in cross section of part of the chassis, showing the structure of the means for fixing a TV.

As best shown in FIG. 3, each side plate 21 of the chassis 20 is provided with two pairs of fixing screws 21b, 21b near its top and bottom, respectively. Each screw 21b may be a thumbscrew or another screw which can be manually operated. As best shown in FIG. 4, each screw 21b has a pressing plate 21b2, which is located at its front end so as not to rotate with fixing screw 21b. The pressing plate 21b2 has a cushion 21b1 fixed to its front side. Each screw 21b engages with one of nuts 21b3 embedded in the side plates 21. The side plates 21 have recesses 21b4 formed in their inner surfaces, each for receiving one of the pressing plates 21b2 and the associated cushion 21b1.

The top supporting shelf 21a of each side plate 21 is provided with a pair of locking levers 31 on its bottom. The bottom supporting shelf 21a of each side plate 21 is provided with a pair of locking levers (locking members) 31 on its top. Each lever 31 is a tapered flat member, which can pivot on a pin or shaft 31a fixed to the associated supporting shelf 21a. Specifically, each lever 31 can pivot between a retracted position (solid lines in FIG. 3) on the supporting shelf 21a and a locking position (two-dot chain lines in FIG. 3), where its free end portion projects greatly from the supporting shelf 21a.

Figure 5:
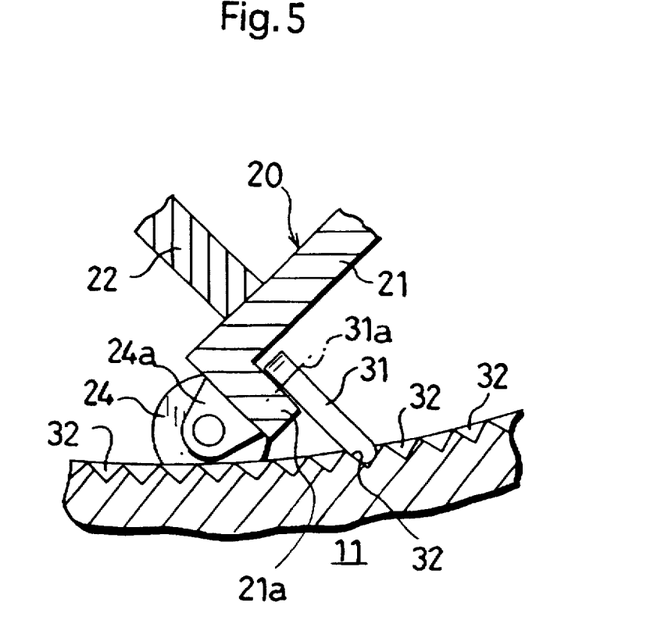
FIG. 5 is an enlarged front view in cross section of part of the supporting device, showing the chassis in its locked position.

As shown in FIGS. 2 and 5, the guide member 11 has a series of axially extending grooves or steps 32 formed between the guide grooves 11a in its inner periphery. By engaging the free end of one or more lock levers 31 with any step or steps 32, the chassis 20 can be locked at an optional angle to the frame 10.

As shown in FIG. 1, a TV can be mounted on the chassis 20. Specifically, when the chassis 20 is in its upright position, the TV can be placed on the bottom plate 22. By tightening the screws 21b so that their pressing plates 21b2 press the side walls of the TV, the TV can be stably fixed. The tightening of each screw 21b should be adjusted so that the pressing plates 21b2 of all screws 21b equally press the side walls of the TV. The wire 23 on the top of the chassis 20 has the same length as the bottom plate 22, and should be under proper tension so that the side plates 21 are parallel to the side walls of the TV.

When all lock levers 31 of the chassis 20 are in their retracted positions, the chassis 20 is unlocked from the frame 10, and can freely turn through rollers 24 along the guide member 11. When the viewer is lying down, the TV can be tilted from its upright position to an optional position so that he/she can comfortably view the TV. After the TV is thus tilted, the appropriate lock levers 31 can be pivoted to the locking positions for engagement with the steps 32 adjacent to the levers. As a result, the chassis 20 can be locked relatively to the frame 10, so that the TV inclination can be fixed.

The TV can be returned to its upright position by disengaging the lock levers 31 from the steps 32, and then turning the chassis 20 along the guide member 11 until the bottom plate 22 becomes horizontal. Thereafter, the lower levers 31 can be pivoted to the locking positions for engagement with the appropriate steps 32. As a result, the chassis 20 can be locked again relatively to the frame 10.

The chassis 20 enables the TV to turn about the horizontal axis by at least 90° in each direction from the upright position. The guide member 11 should have such a length that at least two pairs of rollers 24 (at at least two corners of chassis 20) can engage with the guide grooves 11a at the same time. If the structure of the chassis 20 is symmetrical between its front and rear sides so that the TV can be held with its front or rear on either side of the chassis 20, and even if the chassis 20 is constructed so as to turn about the horizontal axis by at least 90° in only one direction from the upright position, it is possible to turn the TV by 90 in substantially each direction by turning the chassis 20 by 90° clockwise, for example, from the upright position, and holding the TV as turned around by 180°, then turning the chassis 20 by 90° clockwise from the upright position, and next horizontally turning the frame 10 around by 180° so that the TV screen faces the viewer.

Instead of providing the supporting shelf 21a on each corner of the chassis 20 with one pair of lock levers 31, it may be provided with only one lock lever. In place of the steps 32 in series, grooves or recesses may be formed in the inner periphery of the guide member 11 at proper intervals, which depend on the distances between the front ends of the levers 31 in the locking positions.

Figure 6:
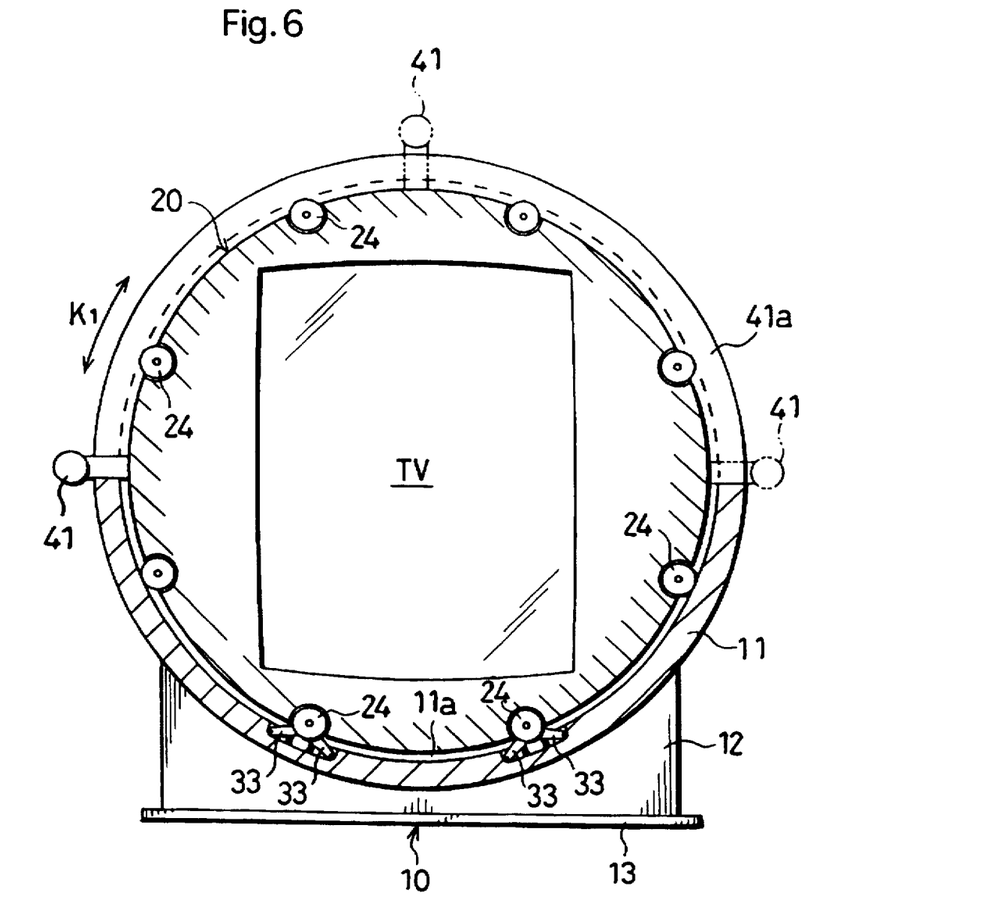
FIG. 6 is a front view in cross section of a TV support according to another embodiment of the invention.
Figure 7:
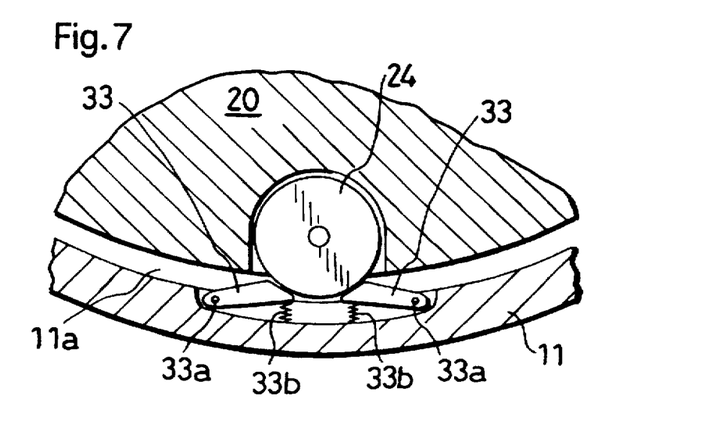
FIG. 7 is an enlarged view of part of FIG. 6.

FIGS. 6 and 7 show the second embodiment, in which the TV supporting device includes a frame 10 and a cylindrical chassis 20 having a horizontal axis. A TV receiver is built into the chassis 20 with the TV screen exposed on the front side of the chassis. The chassis 20 also functions as the TV cabinet.

The chassis 20 supports pairs of rollers 24, 24 . . . on its outer periphery. A small portion of each roller 24 projects out of the chassis 20, and the majority of it is located in the chassis. A turning handle 41 extends outward from the periphery of the chassis 20.

The frame 10 includes a cylindrical guide member 11. The lower half of the guide member 11 has a pair of arcuate guide grooves 11a formed in its inner periphery for guiding the rollers 24. The upper half of the guide member 11 has a slit or slot 41a formed through it, along which the handle 41 can move.

In place of the single handle 41 and slit 41a, two or more such handles and slits may be provided or formed side by side axially of the support, similarly to the rollers 24 and grooves 11a.

As best shown in FIG. 7, two pairs of stop levers (lock member) 33 are provided (only one pair shown in FIG. 7) in each guide groove 11a along the locus of the associated rollers 24. Each pair of levers 33 is symmetrical. Each lever 33 can pivot on a pin 33a fixed to the guide member 11 and extending axially of it. Each lever 33 is urged upward by a compression coil spring 33b so that the levers 33 of each pair is directed at an angle to each other. The free end of each lever 33 is a slope. The sloping ends of the levers 33 can compressively engage with the peripheries of the rollers 24. The levers 33 of each pair can thus nip or catch one roller 24 on radially both sides of the roller.

By manipulating the handle 41, the chassis 20 can be turned clockwise or counterclockwise (in the directions shown by arrow K1 in FIG. 6) to tilt the TV to an optional angle. The chassis 20 can be stopped or held with two pairs of rollers 24 snapped between, or compressively engaged with, the sloping ends of the stop levers 33 against the force of the springs 33b. In other words, the springs 33b can bias the sloping ends of the levers 33 against the peripheries of the rollers 24 to apply rotational resistance to the rollers. By turning the thus held chassis 20 with a force larger than the compressive force of the springs 33b, the rollers 24 can disengage from the levers 33, so that the chassis 20 is free.

The rollers 24 on the chassis 20 are not limited to the arrangement shown in FIG. 6, but any suitable number of rollers may be provided. In place of the two pairs of stop levers 33 in each guide groove 11a, only one pair may be provided in any suitable position on the guide member 11.

Figure 8:
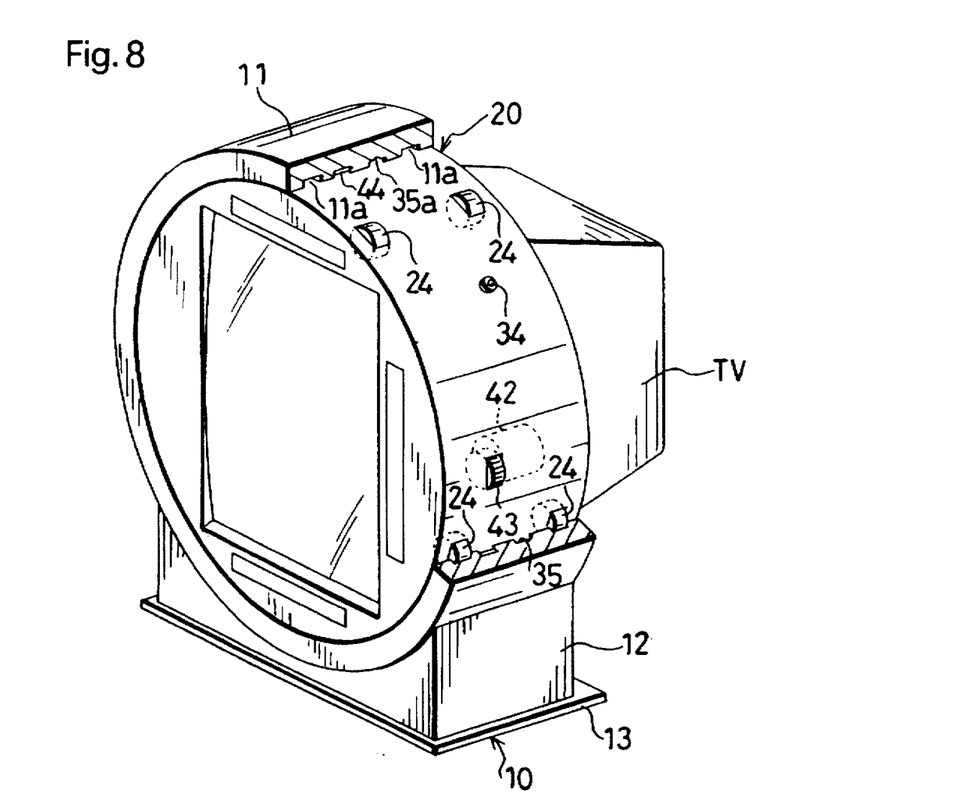
FIG. 8 is a perspective view, partially cut away, of a supporting device according to still another embodiment of the invention.
Figure 9:
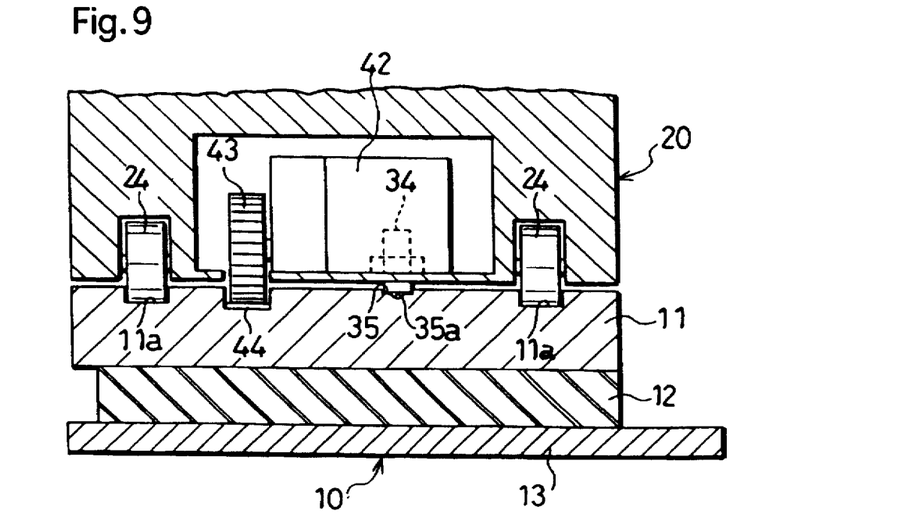
FIG. 9 is an enlarged side view in cross section of part of the support shown in FIG. 8, showing the engagement between the chassis and guide.
Figure 10A:
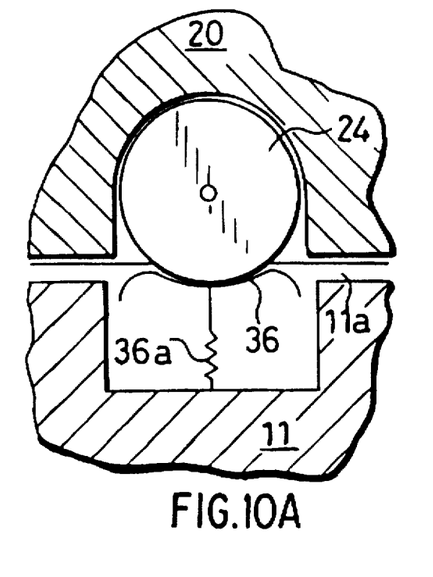
Figure 10B:
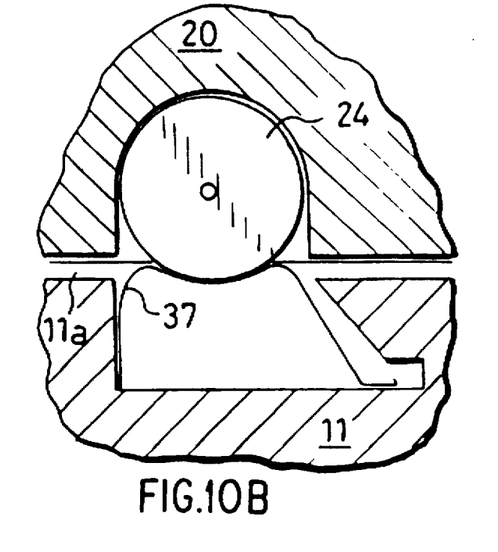
Figure 10C:
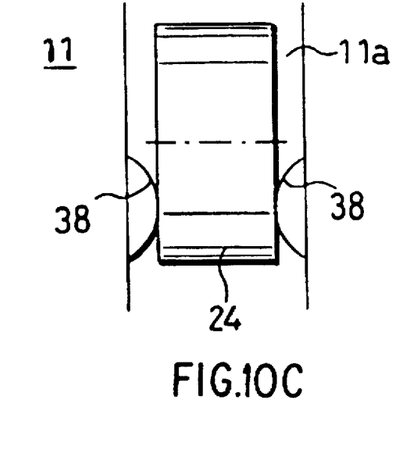
Figure 10D:
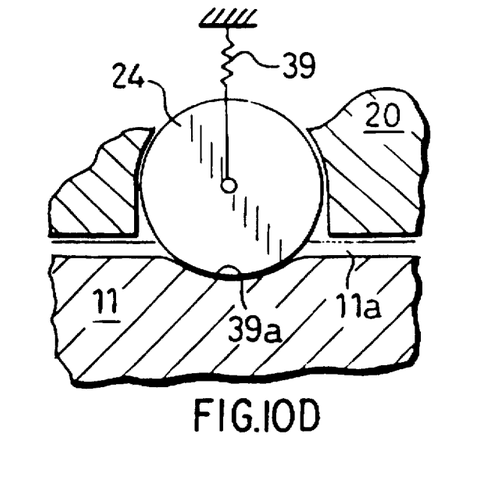

FIGS. 8 and 9 show the third embodiment, in which the TV supporting device includes a frame 10 and a cylindrical chassis 20, which can be turned by an electric motor 42 in place of the handle 41.

The motor 42 is built into the chassis 20. The output shaft of the motor 42 has a pinion 43 fixed to it, which partially projects from the outer periphery of the chassis 20. The frame 10 includes a cylindrical guide member 11 having an internal gear or internal teeth 44 formed in its inner periphery, which engage with the pinion 43. By starting the motor 42, the pinion 43 can be rotated to turn the chassis 20 in either direction along the guide member 11.

Otherwise, a motor and a pinion may be mounted on the frame 10, while an external gear or external teeth may be formed in or on the chassis 20 for engagement with the pinion.

The motor 42 may be adapted to be controlled with a control switch (not shown) or through a remote controller for the TV.

The chassis 20 has on its outer periphery a ball plunger (locking member) 34, the ball of which projects from the periphery. The guide member 11 has a circumferential groove 35 formed in its inner periphery, along which the ball plunger 34 can move. The groove 35 has a number of holes 35a formed in its bottom at proper circumferential intervals. The ball can snap into a hole 35a to hold the chassis 20 at an optional angle to the frame 10.

If a reduction gear is added to the motor 42 for driving the chassis 20, there is no need to provide the ball plunger 34 in addition. By stopping the motor 42 having the reduction gear, it is possible to automatically hold the chassis 20 on the frame 10. The reduction gear functions as a locking member.

In each of the embodiments, the shapes and number of the guide grooves 11a and rollers 24 may be optional, as long as they engage together and cooperate to guide the chassis 20 along the guide member 11. For example, the rollers 24 may be replaced by balls which can roll in the guide grooves 11a. The pair of grooves 11a may otherwise be replaced by one groove, or three or more. The grooves 11a may also be replaced by guide rails, along which the rollers 24 can move. Otherwise, guide grooves may be formed in the chassis 20, while rollers may be provided on the guide member 11.

In FIG. 10 (A), a roller 24 on a cylindrical chassis 20 can be held by a stop plate 36 urged by a compression coil spring 36a, which is fixed at one end to a cylindrical guide member 11. The plate 36 has a top recess for compressive engagement with a roller 24.

In FIG. 10 (B), a leaf or plate spring 37 is fixed at one end to a cylindrical guide member 11, and free at the other end. The spring 37 has a top recess for compressive engagement with a roller 24 on a cylindrical chassis 20.

In FIG. 10 (C), a pair of leaf or plate springs 38 extend in a curve in an inner circumferential guide groove 11a of a cylindrical guide member 11 from both sides of the groove. The radial surfaces of a roller 24 can slidably and compressively engage with the springs 38.

In FIG. 10 (D), each roller 24 is supported through compression coil springs 39 by a cylindrical chassis 20. A cylindrical guide member 11 has an inner circumferential groove 11a. The groove 11a has a shallow recess 39a in its bottom for engagement with part of a roller 24. The springs 39 can bias a roller 24 into the recess 39a so that the recess holds the roller, thereby holding the chassis 20.

As described above, a TV supporting device according to the present invention includes a frame and a chassis for holding a TV. The frame includes an at least partially circular guide having a horizontal axis. The chassis can turn along the guide to tilt the TV to an optional angle. Therefore, the viewer even lying down can comfortably view.

What is claimed is:

1. A supporting device for a TV receiver, comprising:
   a top side open ended semicircular frame having an arcuate guide member with a guide groove;
   a chassis on which the TV receiver is supportable, including
   a pair of side plates and a bottom plate so as to correspond to opposite sides and a bottom of the TV receiver, respectively;
   a securing member including:
   a screw screwed into at least one of the pair of side plates, and
   a pressing plate provided at a front end of the screw;
   wherein the screw is tightenable to press the pressing plate against the side of the TV receiver to be supported in the chassis so as to tightly secure the TV receiver inside the chassis;
   a plurality of rollers provided at opposite ends of the bottom plate and at respective top ends of the side plates, said rollers engaging said guide groove such that said chassis is exclusively rotatable in a circumferential direction;
   at least two of the rollers being engageable with the guide member and rotatably supporting the chassis on the guide member.

2. A supporting device for a TV receiver according to claim 1, which comprises a locking member locking the chassis on the frame.

3. A supporting device as claimed in claim 1, which comprises at least one movable lock lever mounted on said chassis and movable from a locked position engaging the guide member to an unlocked position disengaged from said guide member.

* * * * *